Figure 1:
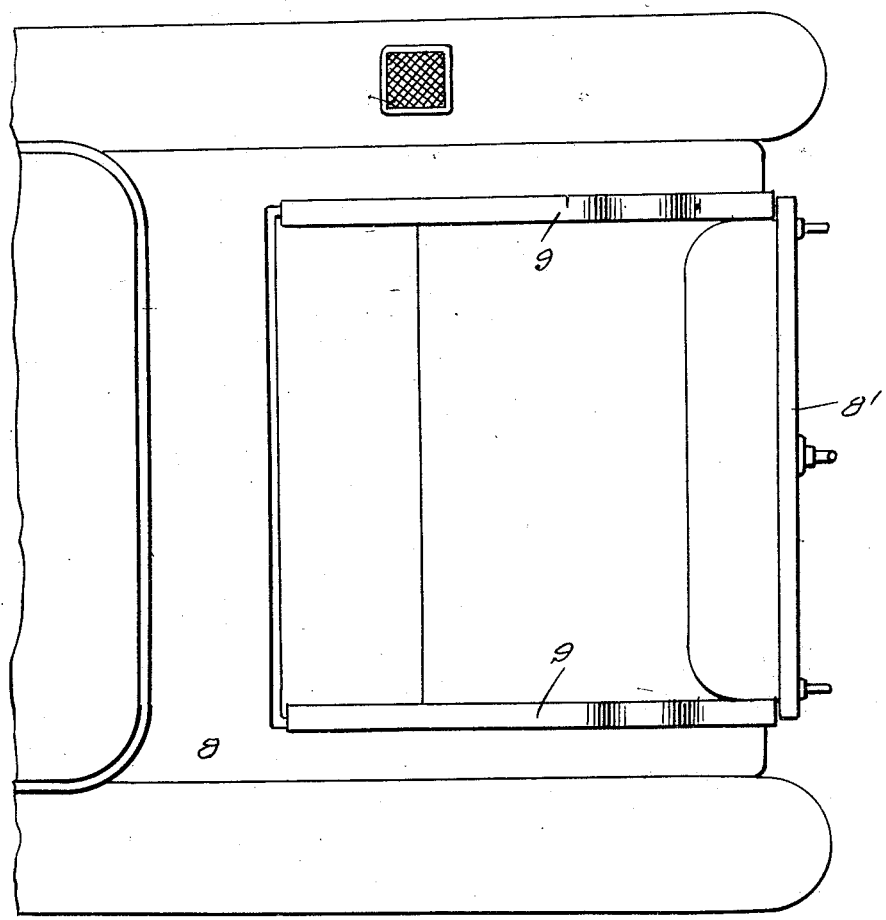

Aug. 4, 1931.  J. C. SCOTT  1,816,937
RUMBLE SEAT AND REST
Filed March 15, 1930   2 Sheets-Sheet 1

Inventor
Julian C. Scott

By Clarence A. O'Brien
Attorney

Aug. 4, 1931.   J. C. SCOTT   1,816,937
RUMBLE SEAT AND REST
Filed March 15, 1930   2 Sheets-Sheet 2

Inventor
Julian C. Scott

By Clarence A. O'Brien
Attorney

Patented Aug. 4, 1931

1,816,937

UNITED STATES PATENT OFFICE

JULIAN C. SCOTT, OF MIDLAND, TEXAS

RUMBLE SEAT AND REST

Application filed March 15, 1930. Serial No. 436,121.

The present invention relates to arm rests for rumble seats and has for its prime object to provide a pair of detachable members which may be seated in the water grooves in the automobile body back.

Another very important object of the invention resides in the provision of arm rests of this nature which are exceedingly simple in their construction, inexpensive to manufacture, easy to manipulate and thoroughly efficient and reliable in use.

With the above and numerous other objects in view as will appear as the description proceeds, the invention resides in certain novel features of construction, and in the combination and arrangement of parts as will be hereafter more fully described and claimed.

Figure 4:
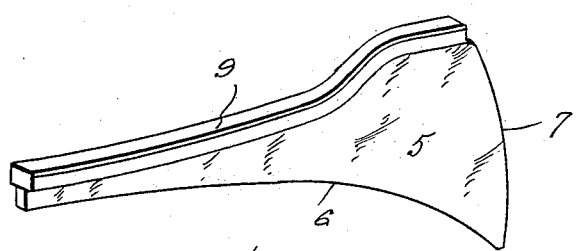
Figure 2:
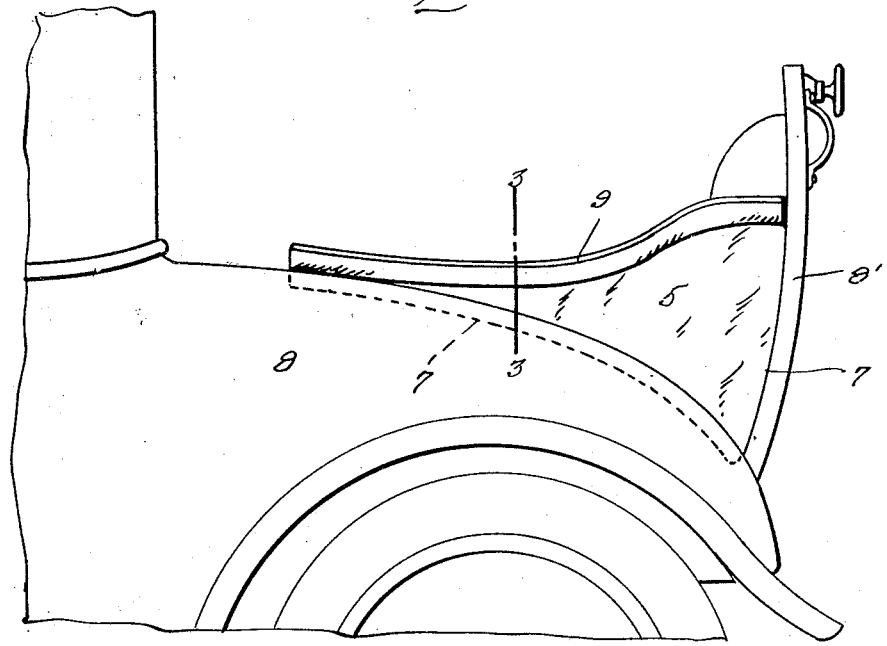
Figure 3:
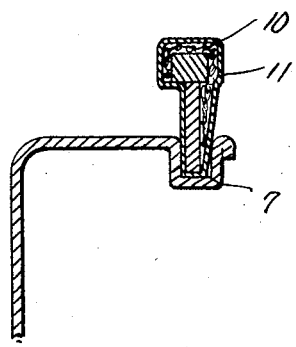

In the drawings:

Figure 1 is a top plan view of the back portion of an automobile showing my improved arm rest and plate, Figure 2 is a side elevation thereof, Figure 3 is a detail section taken substantially on the line 3—3 of Figure 2, and Figure 4 is a perspective view of one of the panels.

Referring to the drawings in detail it will be seen that the numeral 5 denotes a panel the bottom edge 6 of which is curved so as to conform with the curvature of the water groove 7 in the back 8 of the automobile body. The rear edge 7 is curved to conform with the inside curvature of the back 8. The top edge is curved so that the rear thereof is higher than the front therefrom and the cap rail 9 is mounted on the upper edge. This panel and rail may be upholstered in any suitable manner such as by usual padding 10 and leather covering 11.

The arm rests are seated in the water grooves 7 as is best illustrated in Figure 3 and provide comfort for the occupants of the rumble seat. It will be seen that the arm rests are easy to put in place and remove and because of their simplicity in construction may be manufactured cheaply yet with sufficient strength.

By extending the upholstery over the lower part of the device, the device is frictionally held in the water grooves and the rear of the device engages the side edge of the back cushion which also acts to hold the device in position.

It is thought that the construction, utility and advantages of the invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the shape and materials as well as the sizes may be resorted to without departing from the spirit or scope of the invention as hereinafter claimed or sacrificing any of its advantages.

Having thus described my invention, what I claim as new is:

1. In combination with a back of an automobile body having a rumble seat incorporated therein and formed with side water grooves, of panels frictionally held in the grooves and rising therefrom to form arm rests.

2. In combination, with a back of an automobile body having a rumble seat incorporated therein and formed with side water grooves, of panels forming arm rests having their lower edges frictionally held in the grooves, each panel tapering from its rear end to its front end with the upper and lower edges curved, a bead formed on the upper edge, each panel being upholstered with the upholstering extending around the lower part of a panel, whereby the upholstery acts to frictionally hold the panel in the groove, the rear end of the panel engaging the side edge of the back cushion of the rumble seat.

In testimony whereof I affix my signature.

JULIAN C. SCOTT.